United States Patent Office 3,000,461
Patented Sept. 19, 1961

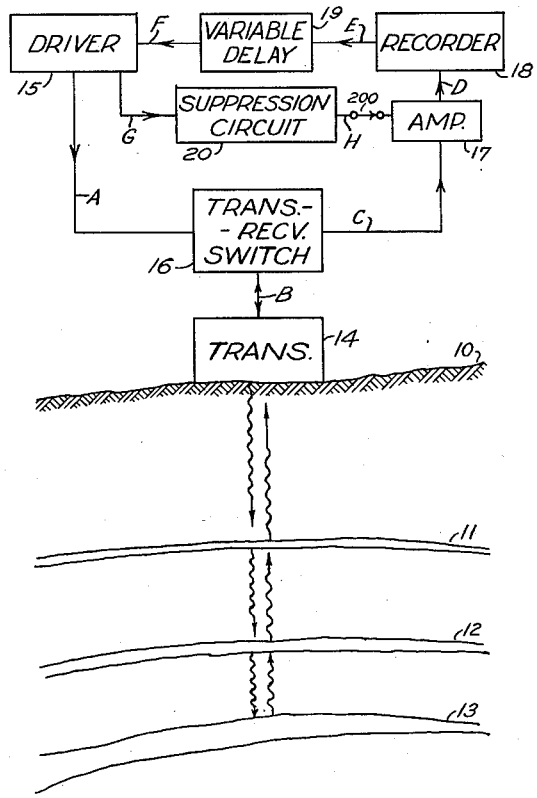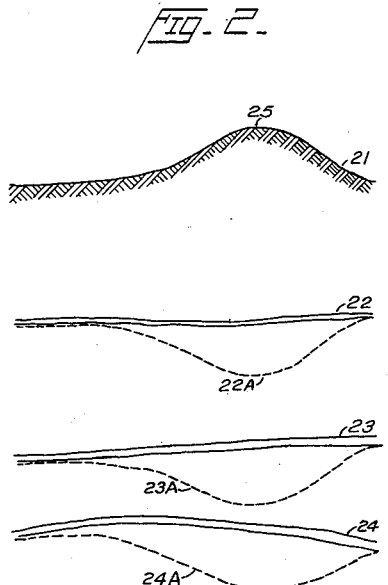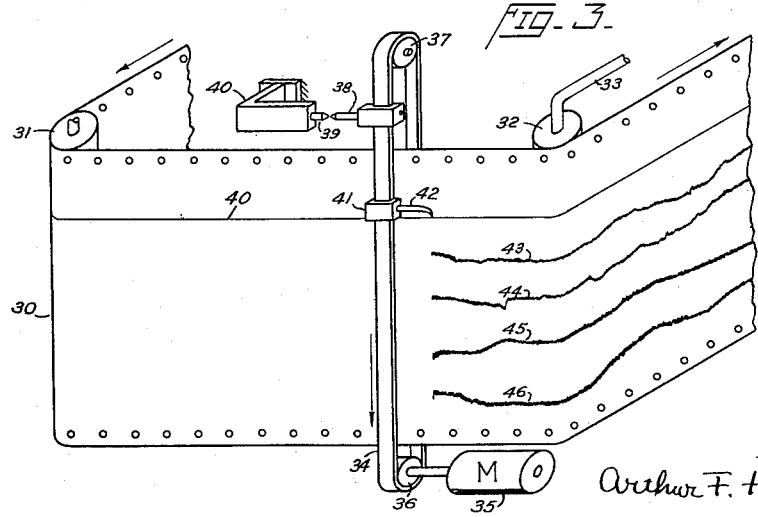

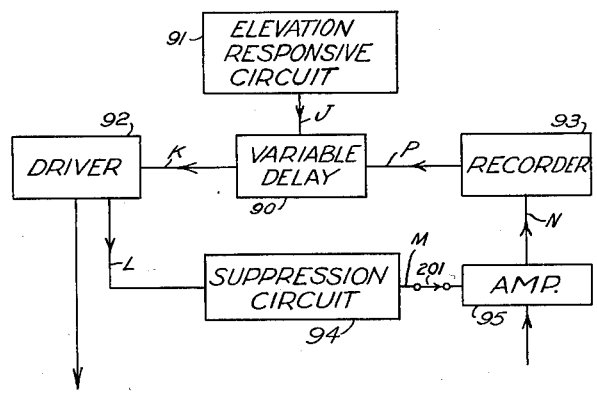
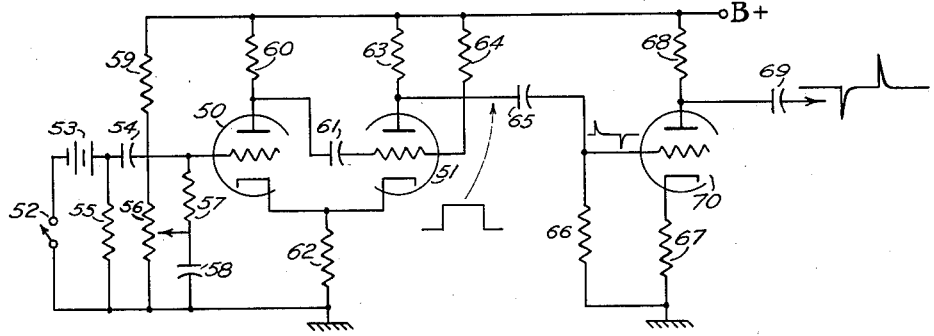
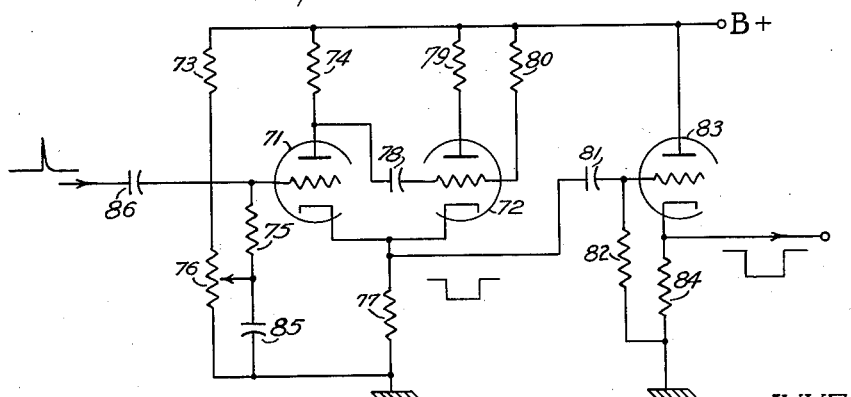

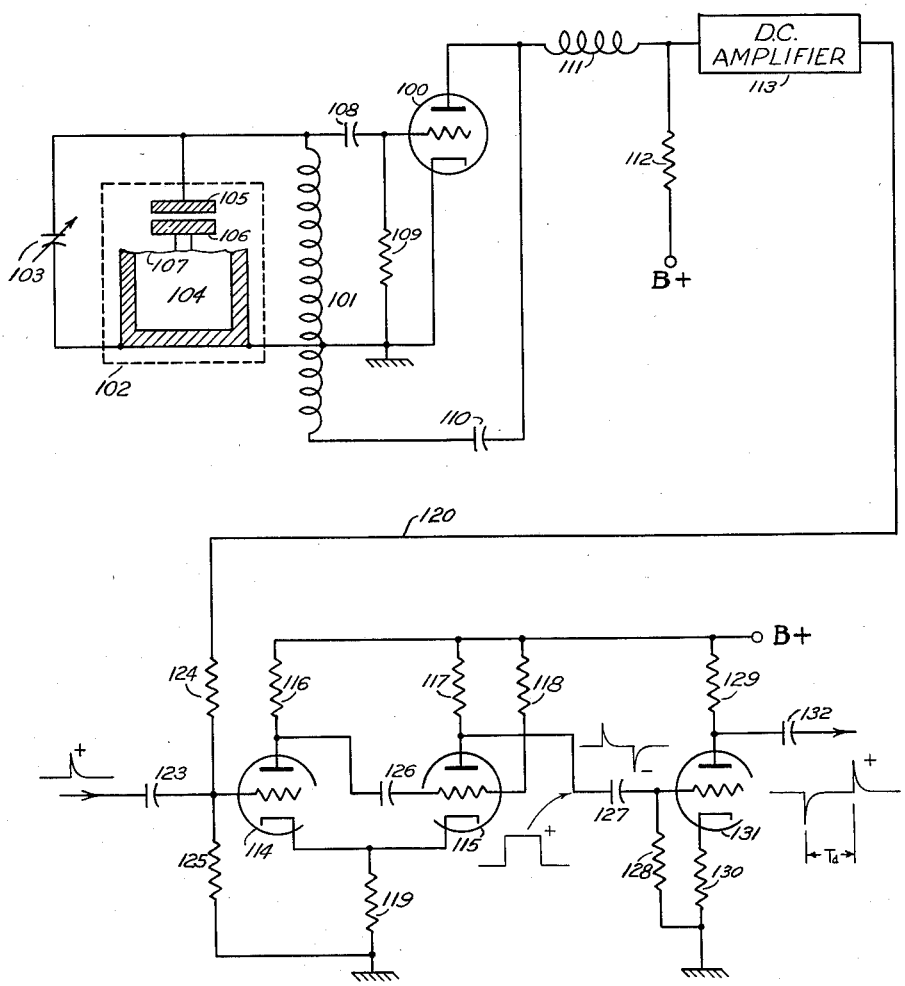

3,000,461
SONIC GEOPHYSICAL EXPLORATION
Arthur F. Hasbrook, Bexar County, Tex., assignor to
Olive S. Petty, San Antonio, Tex.
Filed Feb. 21, 1958, Ser. No. 716,809
4 Claims. (Cl. 181—.5)

This invention relates to sonic geophysical exploration and especially to improvements in the recording of sonic signals so as to simulate a cross section of the sub-surface of the earth. More particularly the invention is concerned with providing corrections for variations in travel-time due to changes in elevation.

In sonic geophysical exploration as generally practiced, sonic impulses are impressed on the surface or near-surface by applying electrical impulses to a transducer or transmitter unit which is closely coupled to the earth. The sonic impulses impressed on the surface travel into the sub-surface and are partially reflected back to the surface by the various interfaces between strata. At the surface the reflected sonic signals are detected by a receiving transducer, converted into electrical signals and applied to a recording medium. When the operating parameters are chosen properly and sub-surface conditions are satisfactory, the various reflections from strata at different depths are displayed with considerable clarity on the recording. Unlike seismic prospecting, in which explosive forces are used to vibrate the earth at its natural frequencies, in sonic exploration many of the system characteristics such as frequency, pulse duration, repetition period and waveform may be varied to produce optimum results. Higher resolution may be provided rather easily so as to furnish greater clarity in the mapping of shallow sub-surface geologic features which may be associated with deposits of valuable minerals or petroleum.

In order to provide directly a simulated geological cross section of the sub-surface which has been explored, the recorder used in sonic exploration is of a type in which the sonic information is displayed on a recording medium wherein horizontal coordinates represent the position on the surface and vertical coordinates correspond to depth. The recording medium usually is an electro-conducting paper which becomes discolored when an electrical current is applied. A recording stylus is moved repetitively across the vertical axis of the recording medium in synchronism with the sonic impulses impressed on the earth's surface, and at a speed which is in definite relationship to the known or assumed velocity of sonic signals in the earth. In this manner the vertical coordinates are arranged to represent depths corresponding to the actual travel-times. As the recording stylus moves across the recording medium, and electrical signals corresponding to sonic signals are applied to the stylus, the recording medium is marked at the proper coordinates representing depths to the reflecting interfaces. The recording medium is moved in a direction perpendicular to the motion of the recording stylus, as the exploration equipment is moved across the earth's surface, so as to make the horizontal coordinates of the recording medium represent the actual distance traversed. The resulting final recording is a representation of a cross section of the earth, with horizontal coordinates representing horizontal position and vertical coordinates representing depth below the surface.

A sonic recording made in the manner just described will provide a useful representation of an actual cross section of the sub-surface, provided that the correct sonic velocity is utilized and that the surface of the earth is constant in elevation. If the elevation of the surface varies, the travel-times of the sonic signals are changed so as to distort the sub-surface representation unless suitable corrections are made. In the previous use of sonic exploration it has been common practice to make any desired corrections for elevation changes subsequent to actual field recording, either in computations or by means of a re-recording process. In the present invention the correction is made directly at the time of recording so that the sub-surface representation is available immediately for visual analysis and utilization.

The principal object of the present invention is to provide an improved method and means of correcting sonic exploration recordings for variations in the elevation of the earth's surface. Another object of the invention is to provide a method and means of applying corrections for elevation changes to a sonic recording at the time of the actual recording. A further object is to furnish means for automatically applying corrections for elevation as the sonic recording equipment is transported across the surface of the earth.

These and other objects and features of the invention will be apparent from the following description and the accompanying drawings wherein:

FIGURE 1 represents a cross section of the earth in conjunction with a block diagram illustrating the general arrangement of the present invention for sonic geophysical exploration;

FIGURE 2 represents a cross section of the sub-surface of the earth illustrating the problem with which the present invention is concerned;

FIGURE 3 illustrates a recorder which is suitable for use in the present invention;

FIGURE 4 is a schematic showing a variable delay circuit suitable for use as 19 in FIGURE 1;

FIGURE 5 is a schematic illustrating a suitable suppression circuit for use as element 20 in FIGURE 1;

FIGURE 6 is a block diagram illustrating generally the use of an elevation-responsive circuit in the invention; and FIGURE 7 is a circuit diagram showing an elevation-responsive circuit and a variable delay circuit controlled by the elevation-responsive circuit.

Referring now to FIGURE 1 of the drawings, a representative cross section of the earth is shown with surface 10 and sub-surface interfaces 11, 12 and 13. The general arrangement of the sonic exploration equipment, according to the present invention, is shown in the block diagram portion of FIGURE 1. The sonic equipment, comprised by transducer 14, driver unit 15, transmit-receive switch 16, amplifier 17, recorder 18, variable delay 19 and suppression circuit 20, is set up on surface 10 and operated so as to transmit sonic signals toward and receive reflected sonic signals from the sub-surface interfaces 11, 12 and 13.

Transducer 14, which may be any of several types, such as magneto-striction or piezo-electric, is closely coupled to the earth's surface and serves both as a transmitter of sonic impulses and receiver of sonic signals. Driver unit 15 is a synchronizable source of high power electrical impulses of the desired duration and repetition rate for proper energization of transducer 14 through cables A and B; suitable designs for such sources are well-known in the sonic and electronic arts. A transmit-receive switch 16 is connected through cable C to amplifier 17 and is provided to protect amplifier 17 from the high power impulses impressed on transducer 14. For low repetition rates, high-speed relays will provide sufficiently rapid response for use as transmit-receive switch 16. More generally the use of transmit-receive tubes of the spark-gap type, widely used in high power radar equipment, will permit operation over a wider range of pulse lengths and repetition rates. When the driver 15 generates impulses, transmit-receive switch 16 simultaneously delivers the impulses to transducer 14 and shorts out the circuit to amplifier 17 to prevent damage. When no impulses are being generated by driver 15, transmit-receive switch 16 connects transducer 14 to amplifier 17 and simultaneously disconnects driver 15 so as to prevent loss of received signal. Amplifier 17 increases the relatively weak signals received by transducer 14 to a level more suitable for utilization in recorder 18, which is connected to amplifier 17 through cable D and is arranged to produce a visual recording representative of the actual cross section of the earth through which the sonic signals have traveled. The variable delay circuit 19 is connected to recorder 18 through cable E and is utilized in providing adjustable synchronization or phasing between a reference position on recorder 18 and the instant of impulse generation by driver unit 15 through cable F. Suppression circuit 20 is connected between driver 15 and amplifier 17 through cables G and H respectively and is used to desensitize amplifier 17, during the time immediately following delivery of an electrical impulse by driver 15, so as to prevent recording of undesirable signals on recorder 18 during this period.

Operation and functioning of the sonic exploration equipment shown in FIGURE 1 is as follows. Recorder 18, which will be described in detail shortly, delivers a synchronizing pulse to variable delay circuit 19 through cable E. After a selected delay time, variable delay 19 supplies a trigger pulse to driver unit 15 through cable F which then generates a high power electrical impulse of the desired characteristics. The electrical impulse from driver 15 is applied via cable A and transmit-receive switch 16 to sonic transducer 14 so as to impress sonic impulses on the surface 10. Sonic signals, resultant from the sonic impulse impressed by transducer 14, travel through the sub-surface and encounter partial reflection at the several interfaces 11, 12 and 13. These reflected sonic signals travel back to the surface 10, are detected by transducer 14 and converted into electrical signals which are applied, by way of transmit-receive switch 16 which is in the receiving mode, to amplifier 17 and finally to recorder 18. As mentioned above, recorder 18 preferably furnishes a permanent type recording in which the electrical signals, representing sonic signals, and the several motions of the recorder mechanism combine to simulate an actual cross section of the sub-surface of the earth.

Since the desired representation of the earth's sub-surface should extend over a considerable horizontal distance, it is necessary to record either continuously or at closely spaced intervals as the sonic equipment is moved across the surface. Usually the surface will change considerably in elevation so that the travel-time of the sonic signals will vary and distort the sub-surface representation unless suitable corrections are made. The effect of elevation change is illustrated in FIGURE 2 of the drawing in which a cross section of the earth is shown with surface 21 of varying elevation and sub-surface interfaces 22, 23 and 24 relatively flat. If an uncorrected sonic recording is made across surface 21, the sonic travel-times beneath hill 25 will be increased in such a manner as to define falsely a synclinal feature as illustrated by the dotted interfaces 22A, 23A and 24A. Conversely, a depressed feature on surface 21, such as a deep valley, would result in a false anticlinal feature on an uncorrected recording. In order to prevent such distortions due to elevation changes, it is necessary to correct for the associated changes in travel-time. In the prior art such corrections for elevation have been made subsequent to the actual field recording by computation and drafting of a corrected representation. In the present invention elevation corrections are applied simultaneously with the sonic recording so as to furnish immediately a corrected recording for visual utilization.

In FIGURE 3 of the drawing there is shown the arrangement of a recorder suitable for direct simulation of an actual cross section of the sub-surface of the earth. Recording medium 30 preferably is of the electro-conducting type which has a rapid response to applied signals and is, therefore, quite suitable for high speed recording. Sprocketed rollers 31 and 32 provide for transport of recording medium 30 in a horizontal direction to simulate change in horizontal position on the surface of the earth. Sprocketed roller 32 is driven by means of a flexible shaft 33 which is connected either to the drive shaft or to one of the wheels of the vehicle in which the equipment is mounted. Thus the rate at which recording medium 30 is moved is directly related to the movement of the equipment over the surface, so that a horizontal scale may be applied to recording medium 30 as an indication of horizontal position on the surface. A flexible band 34 is mounted on support rollers 36 and 37 so as to be moved vertically or perpendicular to the motion of recording medium 30. Support roller 36 is driven by a motor 35 so as to move flexible band 34 at a constant speed. A recording stylus 42 is mounted, by means of mounting block 41, on the outer surface of flexible band 34. At another position on the outer surface of flexible band 34, a moving electrical contact 38 is mounted. The speed with which recording stylus 42 and moving electrical contact 38 are moved across medium 30 is chosen, on the basis of sonic velocity in the earth and normal sonic travel-times, so that vertical coordinates on medium 30 represent depth below the surface. By way of example, if the maximum depth to be explored is 4,000 feet and the average sonic velocity in earth is 8,000 feet per second, then recording stylus 42 and moving electrical contact 38 must traverse the width of recording medium 30 in one second.

Fixed electrical contact 39 is mounted on an insulated mounting bracket 40 so as to contact moving electrical contact 38 once during each revolution of the flexible band 34. This contacting, of the fixed electrical contact 39 and the moving electrical contact 38, results in application of a synchronizing pulse to the variable delay unit 19, shown in the block diagram of FIGURE 1. At the termination of a delay time, as determined by the setting of a control on variable delay 19, a trigger pulse is applied to driver unit 15 so as to initiate generation of a high power impulse which is used to energize the sonic transducer 14. In order to achieve the objects of the invention, the delay time in variable delay 19 may be adjusted to compensate for elevation changes by making the trigger pulse from variable delay 19 either lead or lag the zero or surface reference line 40 on recording medium 30 by the correct amount. Referring again to FIGURE 3, it will be noted that moving electrical contact 38 and recording stylus 42 are fastened at different positions on flexible band 34. By proper adjustment in manufacture or in the field, the moving electrical contact 38 may be arranged to contact fixed electrical contact 39 before recording stylus 42 reaches the zero reference line 40 on recording medium 30. Assuming that variable delay circuit 19 is set to zero delay time, the trigger pulse applied to driver unit 15 and the resultant sonic impulse impressed on surface 10 by transducer 14 will occur before recording stylus 42 reaches zero reference line 43 on recording medium 30. Assuming now that the sonic exploration equipment is set up and operated at an average reference elevation or datum, the delay time of variable delay unit 19 may be adjusted so as to make the sonic impulse from transducer 14 occur at the instant at which recording stylus 42 crosses the zero reference line 40. The equipment is now suitably adjusted to produce elevation-corrected recordings with respect to a particular reference elevation; by adjustment of variable delay circuit 19 for changes in elevation, a corrected recording over a considerable distance may be produced. Suppose, for example, that the sonic exploration equipment is moved to a new location where the elevation is higher; such changes in elevation may be determined from engineering survey notes or by altimeter readings. Variable delay 19 is adjusted to yield less delay time so that the sonic impulse from transducer 14 occurs earlier, with respect to zero reference line 40, in order to correct for the increased travel-time. Conversely, if the new elevation is less than the reference elevation, the variable delay 19 is adjusted to furnish the additional delay time required to correct for the decreased travel-time.

It should be noted that the zero reference line 40 on recording medium 30 is a printed line, which is part of the system of printed coordinate lines, rather than a tracing by recording stylus 42. Unless prevented from doing so, the recording stylus 42 will effect signal tracing corresponding to the transmitted sonic impulse impressed on the surface by transducer 14, and to unwanted reverberation signals in the near-surface layers. Since these signals usually are of no particular interest, it is desirable to clarify the recording by providing suppression of this portion. Suppression circuit 20, in FIGURE 1 of the drawing, is connected so as to be actuated by the output impulse from driver circuit 15 and furnish a suppression signal via closed circuit switch 200 to amplifier 17 during and immediately following the transmission of the sonic impulse by transducer 14. As a result no received electrical signals from transducer 14 are passed through amplifier 17 to recorder 18 during this period of suppression, resulting in improved appearance of the final recording. In some prospect areas, suppression of the signals corresponding in time to the initial sonic impulse, and those immediately following, may not be desirable. For recording in such areas, switch 200 may be opened so as to disconnect suppression circuit 20 from amplifier 17. With no suppression, the initial vertical tracing by stylus 42 will vary with elevation corrections so as to represent the actual changes in elevation; such a representation may be advantageous in some areas.

FIGURE 4 of the drawing is a schematic illustrating a suitable circuit for use as variable delay 19 in FIGURE 1. The cathode-coupled delay multivibrator, comprised by vacuum tubes 50 and 51 and the associated components, is well-known in the field of pulse circuitry and requires only brief description. In the quiescent state tube 51 conducts plate current due to the positive grid bias applied via resistor 64 from the high potential supply. This plate current through tube 51 also flows through common cathode resistor 62 so as to place a high positive voltage on the cathode of tube 50, equivalent to high negative bias on the control grid, and thus cut off plate current flow in tube 50. When a positive pulse of sufficient amplitude is applied to the control grid of tube 50, plate current flows and multivibrator action occurs so as to furnish a positive voltage pulse at the plate of tube 51. The duration of this positive pulse is determined primarily by the values of coupling capacitor 61, grid resistor 64 and the positive bias voltage applied to the control grid of tube 50 by way of the adjustable voltage network comprised by potentiometer 56 and resistor 59.

By adjustment of the tap on potentiometer 56, the positive bias voltage on the control grid of tube 50 is varied so as to change the duration of the positive pulse output at the plate of tube 51. Switch 52 is comprised by fixed electrical contact 39 and moving electrical contact 38 shown in FIGURE 3. When switch 52 is closed momentarily, current flows from battery 53 through resistor 55 so as to produce a voltage pulse which is impressed on the control grid of tube 50 via coupling capacitor 54. Multivibrator action then occurs and a positive pulse is produced at the plate of tube 51. The onset of this pulse at the plate of tube 51 corresponds to the instant at which switch 52 is closed, and the trailing edge is determined by the setting of potentiometer 56. This positive pulse is differentiated by suitable choice of the values of capacitor 65 and resistor 66 so as to supply a short positive pulse corresponding to the onset and a negative pulse derived from the trailing edge. After amplification by tube 70 the positive and negative pulses appear in reversed order, with the positive corresponding to the trailing edge and therefore to the so-called delay time. The grid of tube 70 may be biased only slightly negative so that positive input pulses are relatively ineffective in producing output at the plate; under this bias condition, the output at the plate of tube 70 will be predominantly a positive pulse corresponding to the trailing edge of the positive pulse present at the plate of tube 51. This positive pulse at the plate of tube 70 may be applied by way of isolation capacitor 69 to the driver circuit 15 shown in FIGURE 1. Thus, by adjustment of potentiometer 56 the delay time is changed so as to effect delayed triggering of driver 15 and in this manner compensate for elevation changes.

In FIGURE 5 of the drawing a schematic is shown to illustrate a circuit suitable for use as the suppression circuit 20 which is part of FIGURE 1. A delay multivibrator circuit comprised by vacuum tubes 71 and 72, and associated components, is arranged to produce output pulses of variable duration. When normally cut-off tube 71 is triggered by a positive pulse applied via capacitor 86 to the control grid, a negative pulse appears across cathode resistor 77. The duration of this negative pulse may be controlled by varying potentiometer 76 which supplies positive bias to the control grid of tube 71. To prevent undesirable reaction on tubes 71 and 72, the negative pulse across cathode resistor 77 is applied to the control grid of cathode follower tube 83. The resulting negative output pulse across cathode resistor 84 may be applied to the control grid of the amplifier 17, shown in FIGURE 1, so as to greatly reduce the signal gain during the period of and immediately following the transmitted sonic impulse.

Under certain conditions of operation in the field, and particularly where continuous recording must be employed to obtain the desired representation of the subsurface, it is preferable to provide apparatus which continually and automatically corrects the recording for differences in elevation. Referring now to FIGURE 6 of the drawing, there is shown a block diagram of the general arrangement for automatically providing elevation corrections. The circuitry shown is comprised partially by units previously described, namely: variable delay circuit 90, driver circuit 92, recorder 93, suppression circuit 94 and amplifier 95. To these are added an elevation-responsive circuit 91 which is arranged to control variable delay 90 in suitable manner to achieve variable synchronization or phasing between recorder 93 and driver 92, so as to provide a final recording which is corrected for changes in elevation. Elevation-responsive circuit 91 is connected to variable delay 90 through cable J. Cable K connects the output of variable delay 90 to driver 92. Driver 92 is connected to suppression circuit 94 by means of cable L. The output of suppression circuit 94 is connected to amplifier 95 through cable M. Amplifier 95 is connected to recorder 93 through cable N while recorder 93 is connected to variable delay 90 by cable P. Elevation-responsive circuit 91 may be of any type which will furnish elevation correction signals as a function of change in elevation; for example, some devices known as elevation meters, which continuously determine the curvature of the surface over which the vehicle rolls and obtain the elevation as a result of integration, can provide suitable correction signals. Changes in barometric pressure, which result from changes in elevation, also may be utilized to provide elevation correction signals, provided due precautions are taken to avoid errors due to normal barometric variations.

In FIGURE 7 of the drawing, circuitry is shown for providing elevation correction signals as a function of barometric pressure changes resulting from differences in elevation. Vacuum tube 100 and the associated components comprise an oscillator circuit in which changes in barometric pressure change the oscillation frequency so as to produce an output signal. The tuned oscillation circuit is comprised by inductance 101, variable capacitor 103 and a pressure-responsive capacitor 102, shown in dotted enclosure. Variable capacitor 103 provides for adjustment of the circuit at a standard reference elevation. A grid capacitor 108 and resistor 109 provide for proper grid biasing. Capacitor 110 provides for feedback of signal from the plate of tube 100 to the grid circuit so as to effect oscillation. The pressure-responsive capacitor 102 is comprised by a sealed chamber 104, flexible diaphragm 107, moving plate 106 and fixed plate 105. Moving plate 106 and fixed plate 105 form a capacitor whose value is varied by motion of the diaphragm 107 as a result of changing barometric pressure due to elevation differences. This change in capacity is connected across the oscillation circuit so as to effect a corresponding change in oscillation frequency. The impedance of the oscillation circuit will vary with frequency, resulting in changes in the plate current which flows through tube 100, the radio-frequency isolation choke 111 and the plate load resistor 112. Thus variations in the capacitance of pressure-responsive capacitor 102 result in change in plate current flow through tube 100, and consequently in signal voltages across plate load resistor 112. These signal voltages are amplified by direct current amplifier 113 so as to provide elevation correction signals which are applied through conductor 120 to a variable delay multivibrator comprised by vacuum tubes 114 and 115 and associated circuit components. Functioning of the variable delay multivibrator is essentially as described previously in connection with FIGURE 4 of the drawing. The elevation-correction signals from direct current amplifier 113 are applied to the control grid of tube 114 so as to determine the duration of the positive output pulse at the plate of tube 115. This output pulse is then differentiated and applied to amplifier tube 131 in order to provide a positive output pulse representing the delay time of the multivibrator circuit. The positive pulse from tube 131 is applied, via a capacitor 132, to the driver 15, so as to effect transmission of sonic impulses in the manner previously described.

In operation the circuitry of FIGURE 7 is adjusted in the following manner. With the sonic exploration equipment set up at a known reference elevation, variable capacitor 103 is adjusted so as to tune the oscillation circuit associated with tube 100 to a standard value which produces output signals at the plate of tube 131 corresponding in time to the zero reference line 43 on recording medium 30. When the equipment is moved to a new elevation, the resultant change in pressure will cause pressure-responsive capacitor 102 to vary and produce suitable output correction signals from tube 131. Changes in pressure due to causes other than change in elevation may be corrected for, when necessary, by adjustment of variable capacitor 103.

Although a preferred embodiment of the invention has been disclosed in sufficient detail to enable anyone skilled in the art to construct and use same, it is to be understood that numerous changes and modifications could be made without departing from the scope of the invention.

Having thus described the invention, I claim:

1. Apparatus for use in sonic geophysical exploration comprising a recording medium, recording stylus means for repetitively traversing said recording medium, a source of electrical impulses, circuit controlling means electrically connected with said source and operable in timed relation with the movement of said stylus means for activating said source to initiate said impulses, elevation-sensitive adjustment means operatively associated with said circuit controlling means to advance or retard in time to the position of said stylus means for the initiation of impulses from said source in conformity with change in elevation of said apparatus, said adjustment means comprising an elevation-sensitive circuit generating corrective signals representing changes in elevation of said apparatus, and a variable delay circuit receiving said corrective signals, said variable delay circuit being comprised in said circuit controlling means, and a sonic transducer electrically connected with said source for converting said eletrical impulses into sonic impulses and impressing the latter on the surface of the earth, whereby delay in arrival time of reflected sonic impulses resulting from changes in elevation of said apparatus is compensated.

2. Apparatus for use in sonic geophysical exploration comprising a recording medium, recording stylus means for repetitively traversing said recording medium, a source of electrical impulses, circuit controlling means electrically connected with said source and operable in timed relation with the movement of said stylus means for activating said source to initiate said impulses, elevation-sensitive adjustment means operatively associated with said circuit controlling means to advance or retard in time to the position of said stylus means for the initiation of impulses from said source in conformity with changes in elevation of said apparatus, and a sonic transducer electrically connected with said source for converting said electrical impulses into sonic impulses and impressing the latter on the surface of the earth, whereby delay in arrival time of reflected sonic impulses resulting from changes in elevation of said apparatus is compensated, said adjustment means comprising a variable delay circuit included in said circuit controlling means.

3. Apparatus for use in sonic geophysical exploration comprising a recording medium, recording stylus means for repetitively traversing said recording medium, a source of electrical impulses, circuit controlling means electrically connected with said source and operable in timed relation with the movement of said stylus means for activating said source to initiate said impulses, elevation-sensitive adjustment means operatively associated with said circuit controlling means to advance or retard in time to the position of said stylus means for the initiation of impulses from said source in conformity with changes in elevation of said apparatus, a sonic transducer electrically connected with said source for converting said electrical impulses into sonic impulses and impressing the latter on the surface of the earth, whereby delay in arrival time of reflected sonic impulses resulting from changes in elevation of said apparatus is compensated, said sonic transducer being electrically connected to said stylus for converting the reflected sonic impulses into electrical signals and applying the same to said stylus, and means coupled to said recording medium for moving said recording medium with respect to said stylus means to produce a visual recording corrected for elevation changes.

4. Apparatus for use in sonic geophysical exploration comprising a recording medium, recording stylus means for repetitively traversing a recording medium, a source of electrical impulses, circuit controlling means including time delay means electrically connected with said source and operable in timed relation with the movement of said stylus for activating said source to initiate said impulses and elevation-sensitive adjustment means operatively associated with said time delay means to advance or retard in time to the position of said stylus means for the initiation of impulses from said source in conformity with changes in elevation of said apparatus, said adjustment means comprising an oscillator circuit in which the output signal voltage varies with changes in barometric pressure resulting from changes in elevation of said apparatus, and a sonic transducer electrically connected with said source for converting said electrical impulses into sonic impulses and impressing the latter on the surface of the earth, whereby delay in arrival time of reflected sonic impulses resulting from changes in elevation of said apparatus is compensated.

References Cited in the file of this patent

UNITED STATES PATENTS

| | | |
|---|---|---|
| 2,440,971 | Palmer | May 4, 1948 |
| 2,688,124 | Doty et al. | Aug. 31, 1954 |
| 2,767,389 | McCollum | Oct. 16, 1956 |
| 2,827,619 | Fryklund | Mar. 18, 1958 |
| 2,841,777 | Blake et al. | July 1, 1958 |
| 2,866,512 | Padberg | Dec. 30, 1958 |